(12) United States Patent
Yu

(10) Patent No.: US 11,774,795 B2
(45) Date of Patent: Oct. 3, 2023

(54) LIQUID CRYSTAL DISPLAY PANEL

(71) Applicant: Wuhan China Star Optoelectronics Technology Co., Ltd., Wuhan (CN)

(72) Inventor: Pengfei Yu, Wuhan (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 16/615,862

(22) PCT Filed: Sep. 24, 2019

(86) PCT No.: PCT/CN2019/107394
§ 371 (c)(1),
(2) Date: Nov. 22, 2019

(87) PCT Pub. No.: WO2020/252965
PCT Pub. Date: Dec. 24, 2020

(65) Prior Publication Data
US 2022/0413336 A1    Dec. 29, 2022

(30) Foreign Application Priority Data

Jun. 17, 2019 (CN) .......................... 201910521654.1

(51) Int. Cl.
*H04M 1/02* (2006.01)
*G02F 1/1335* (2006.01)
(52) U.S. Cl.
CPC .. *G02F 1/133531* (2021.01); *G02F 1/133512* (2013.01)

(58) Field of Classification Search
None
See application file for complete search history.

(56) References Cited

FOREIGN PATENT DOCUMENTS

| CN | 108628043 A | 10/2018 | | |
|---|---|---|---|---|
| CN | 108873473 A | 11/2018 | | |
| CN | 108957819 A | 12/2018 | | |
| CN | 108957829 A | 12/2018 | | |
| CN | 108957855 A | * 12/2018 | ....... | G02F 1/133605 |
| CN | 108983469 A | 12/2018 | | |
| CN | 109116621 A | 1/2019 | | |
| CN | 109597236 A | 4/2019 | | |
| JP | H02122999 A | 5/1990 | | |
| JP | 2006243573 A | 9/2006 | | |

* cited by examiner

*Primary Examiner* — Thanh Nhan P Nguyen
(74) *Attorney, Agent, or Firm* — PV IP PC; Wei Te Chung; Zhigang Ma

(57) ABSTRACT

A liquid crystal display panel, including a display body, a lower polarizer, and a backlight plate. The display body includes a light transmission hole, the backlight plate includes a light shielding plate connected to the display body, the light shielding plate is provided with a first through hole coaxial with the light transmission hole; wherein the display body is provided with an annular shielding member located in the first through hole, the annular shielding member is provided with a second through hole coaxial with the light transmission hole, a diameter of the second through hole is greater than or equal to a diameter of the light transmission hole.

14 Claims, 3 Drawing Sheets

LIQUID CRYSTAL DISPLAY PANEL

FIELD OF INVENTION

This invention relates to the field of display technologies, and, in particular, to a liquid crystal display panel.

BACKGROUND OF INVENTION

At present, a liquid crystal display panel includes a display body, an upper polarizer disposed on an upper side of the display body, a lower polarizer disposed on a lower side of the display body, and a backlight plate, wherein the display body includes a color filter substrate and an array substrate disposed opposite to each other. In order to dispose electronic components such as a receiver and a camera in a full-screen liquid crystal display panel, it is necessary to form holes in the display panel. Traditionally, holes in the display panel are divided into through holes and blind holes. A blind hole means that a space for a circular hole is reserved when the color filter substrate and the array substrate are coated, and then the layers at the position of the circular hole are dug to form the hole. When the color filter substrate is assembled with the array substrate, liquid crystals are dropped into the circular hole to form a circular transparent region in the LCD display panel, and then a backlight plate with a circular hole is aligned and assembled with the display body.

At present, when the backlight plate and the display body are assembled, the circular hole is double-coated with a light shielding glue. When the glue is applied for the first time, the glue fills an edge gap formed in the lower polarizer at the edge of the circular hole. When the glue is applied for the second time, the light shielding glue is applied to an area between a through hole on the backlight plate and the circular hole on the display body, thereby ensuring that a light source does not leak to the circular hole area, which affects product display effect and camera image function.

However, in this double-coating method, the coated light shielding glue is used as an outer edge of the circular hole, and the coating precision may cause problems such as lack of glue or glue overflowing in the coating of the light shielding glue, thereby causing problems such as the circular hole is not perfectly round, or the circular hole is indented or protruding.

TECHNICAL PROBLEMS

Due to the influence of coating precision, the light shielding glue may be coated with lack of glue or glue overflowing, thereby causing technical problems such as the circular hole is not perfectly round, or the circular hole is indented or protruding.

SUMMARY OF INVENTION

A liquid crystal display panel, including a display body, an upper polarizer, a lower polarizer, and a backlight plate disposed on a back side of the lower polarizer. The display body includes a light transmission hole; the backlight plate includes a light shielding plate connected to the display body, the light shielding plate is provided with a first through hole coaxial with the light transmission hole, and a diameter of the first through hole is greater than a diameter of the light transmission hole;

wherein the display body is provided with an annular shielding member located in the first through hole, the annular shielding member is provided with a second through hole coaxial with the light transmission hole, a diameter of the second through hole is greater than or equal to the diameter of the light transmission hole; the annular shielding member is in contact with a sidewall of the first through hole; and the annular shielding member is made from a light shielding tape.

Further, the lower polarizer is provided with a third through hole coaxial with the light transmission hole, and a diameter of the third through hole is greater than the diameter of the first through hole.

Further, the display body is provided with a light shielding adhesive layer between a sidewall of the third through hole and the annular shielding member.

Further, a bonding layer is disposed between the light shielding plate and the light shielding adhesive layer, and the light shielding plate is connected to the light shielding adhesive layer by the bonding layer.

Further, the bonding layer is a black light blocking layer.

Further, a distance between a side of the light shielding plate near to the display body and the display body is less than a thickness of the annular shielding member.

Further, the annular shielding member has an annular cross section as a whole.

Further, a fourth through hole coaxial with the light transmission hole is disposed on the upper polarizer, and a diameter of the fourth through hole is greater than or equal to the diameter of the light transmission hole.

A liquid crystal display panel, including a display body, an upper polarizer, a lower polarizer, and a backlight plate disposed on a back side of the lower polarizer. The display body includes a light transmission hole; the backlight plate includes a light shielding plate connected to the display body, the light shielding plate is provided with a first through hole coaxial with the light transmission hole, and a diameter of the first through hole is greater than a diameter of the light transmission hole;

wherein the display body is provided with an annular shielding member located in the first through hole, the annular shielding member is provided with a second through hole coaxial with the light transmission hole, and a diameter of the second through hole is greater than or equal to the diameter of the light transmission hole.

Further, the annular shielding member is made from a light shielding tape.

Further, the lower polarizer is provided with a third through hole coaxial with the light transmission hole, and a diameter of the third through hole is greater than the diameter of the first through hole.

Further, the display body is provided with a light shielding adhesive layer between a sidewall of the third through hole and the annular shielding member.

Further, a bonding layer is disposed between the light shielding plate and the light shielding adhesive layer, and the light shielding plate is connected to the light shielding adhesive layer by the bonding layer.

Further, the bonding layer is a black light blocking layer.

Further, a distance between a side of the light shielding plate near to the display body and the display body is less than a thickness of the annular shielding member.

Further, the annular shielding member is in contact with a sidewall of the first through hole.

Further, the annular shielding member has an annular cross section as a whole.

Further, a fourth through hole coaxial with the light transmission hole is disposed on the upper polarizer, and a diameter of the fourth through hole is greater than or equal to the diameter of the light transmission hole.

Beneficial Effect

The formed annular shielding member is formed by using the light shielding tape, and then the second through hole in the annular shielding member is aligned with and attached to the light transmission hole to ensure the installing precision of the annular shielding member, such that under the premise of ensuring size of the light transmission hole is unchanged, size of the lighting area of the light transmission hole is not affected, and the annular shielding member is used instead of the double-coating process of a light shielding glue, light is prevented from leaking to the lighting area of the camera, and the problems such as lack of glue or glue overflowing in the coating of the light shielding glue caused by coating precision are prevented, thereby avoiding problems such as the circular hole 11 is not perfectly round, or edge line of the circular hole 11 is indented or protruding.

DESCRIPTION OF DRAWINGS

In order to more clearly illustrate the technical solutions in the embodiments of the present invention, the drawings which are used in the description of the embodiments will be briefly described below. It is obvious that the drawings in the following description are only some embodiments of the present invention. Other drawings can also be obtained from those skilled in the art without paying any creative effort.

Figure 1:
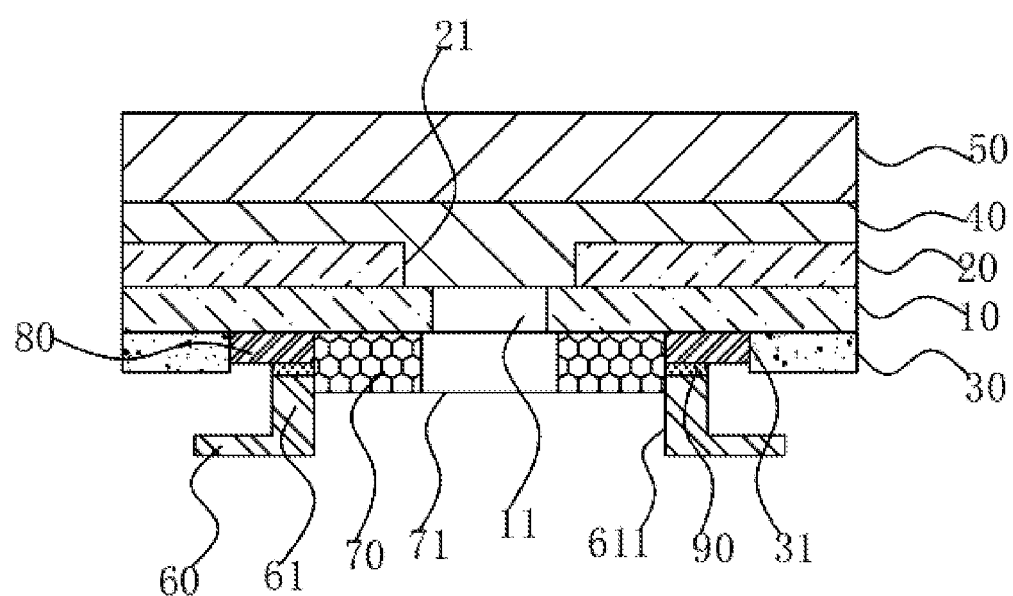
FIG. 1 is a schematic structural view of a liquid crystal display panel in an embodiment of the present invention.

REFERENCE NUMBERS OF THE PARTS IN THE FIGURES 10, display body; 11, light transmission hole; 20, upper polarizer; 21, fourth through hole; 30, lower polarizer; 31, third through hole; 40, adhesive protective layer; 50, cover plate; 60, backlight plate; 61, light shielding plate; 611, first through hole; 70, annular shielding member; 71, second through hole; 80, light shielding adhesive layer; 90, bonding layer.

DETAILED DESCRIPTION OF PREFERRED EMBODIMENTS

The following description of the various embodiments is provided to illustrate the specific embodiments of the invention. Directional terms mentioned in the present invention, such as "top", "bottom", "front", "back", "left", "right", "inside", "outside", "side", etc., are merely directions of the figures. Therefore, the directional terms are used for the purpose of illustration and understanding of the invention rather than limiting the invention. In the figures, structurally similar elements are denoted by the same reference numerals.

In a traditional liquid crystal display panel, coating precision may cause problems such as lack of glue or glue overflowing in the coating of the light shielding glue, thereby causing problems such as the circular hole is not perfectly round, or the circular hole is indented or protruding. The present invention can solve the above technical problems.

A liquid crystal display panel, as shown in FIG. 1, the liquid crystal display panel includes a display body 10, an upper polarizer 20, a lower polarizer 30, and a backlight plate 60 disposed on a back side of the lower polarizer 30.

The upper polarizer 20 is disposed on a display side of the display body 10, the lower polarizer 30 is disposed on a back side of the display body 10, a cover plate 50 is disposed on the upper polarizer 20, and the cover plate 50 is bonded and fixed to the upper polarizer 20 by an adhesive protective layer 40.

Specifically, the display body 10 includes a light transmission hole 11, the backlight plate 60 includes a light shielding plate 61 connected to the display body 10, the light shielding plate 61 is provided with a first through hole 611 coaxial with the light transmission hole 11, and a diameter of the first through hole 611 is greater than a diameter of the light transmission hole 11.

The display body 10 is provided with an annular shielding member 70 located in the first through hole 611, the annular shielding member 70 is provided with a second through hole 71 coaxial with the light transmission hole 11, a diameter of the second through hole 71 is greater than or equal to the diameter of the light transmission hole 11.

An optical component such as a camera is installed on the back side of the display body 10 and corresponds to the position of the light transmission hole 11, and the light shielding plate 61 and the annular shielding member 70 are used to prevent light from leaking to the lighting area of the camera, under the premise of ensuring size of the light transmission hole 11 is unchanged, size of the lighting area of the light transmission hole 11 is not affected, and the formed annular shielding member 70 is used instead of the double-coating process of a light shielding glue, so the process is simple, and the problems such as lack of glue or glue overflowing in the coating of the light shielding glue caused by coating precision are prevented, thereby avoiding problems such as the circular hole 11 is not perfectly round, or edge line of the circular hole 11 is indented or protruding.

Specifically, the lower polarizer 30 is provided with a third through hole 31 coaxial with the light transmission hole 11, and a diameter of the third through hole 31 is greater than the diameter of the first through hole 611.

Further, the display body 10 is provided with a light shielding adhesive layer 80 between a sidewall of the third through hole 31 and the annular shielding member 70.

In a manufacturing process of the liquid crystal display panel, after the lower polarizer 30 is aligned with and attached to the display body 10, the light shielding adhesive layer 80 is coated in the third through hole 31. By the light shielding adhesive layer 80 in an area between the third through hole 31 and the light transmission hole 11, light emitted from light source is prevented from leaking from a gap between the lower polarizer 30 and the display body 10 to the lighting area of the camera.

Specifically, a bonding layer 90 is disposed between the light shielding plate 61 and the light shielding adhesive layer 80, and the light shielding plate 61 is connected to the light shielding adhesive layer 80 by the bonding layer 90.

Further, the bonding layer 90 is a black light blocking layer. The light shielding plate 61 and the light shielding adhesive layer 80 are bonded and fixed to each other by the bonding layer 90, thereby connecting the light shielding plate 61 and the display body 10, while the gap between an end surface of the light shielding plate 61 and the display body 10 is blocked by the bonding layer 90 to prevent light from leaking into the lighting area of the camera.

In an embodiment, the bonding layer 90 is a twin adhesive.

It should be noted that, in actual implementation, material of the bonding layer 90 may also be other materials with strong viscosity and light shielding properties, such as black glue, etc.

Specifically, a distance between a side of the light shielding plate 61 near to the display body 10 and the display body 10 is less than a thickness of the annular shielding member 70.

Simultaneously, the gap between the end surface of the light shielding plate 61 and the display body 10 is blocked by the annular shielding member 70 and the adhesive layer 90, thereby achieving a better light blocking effect.

Specifically, a fourth through hole 21 coaxial with the light transmission hole 11 is disposed on the upper polarizer 20, and a diameter of the fourth through hole 21 is greater than or equal to the diameter of the light transmission hole 11.

Figure 2:
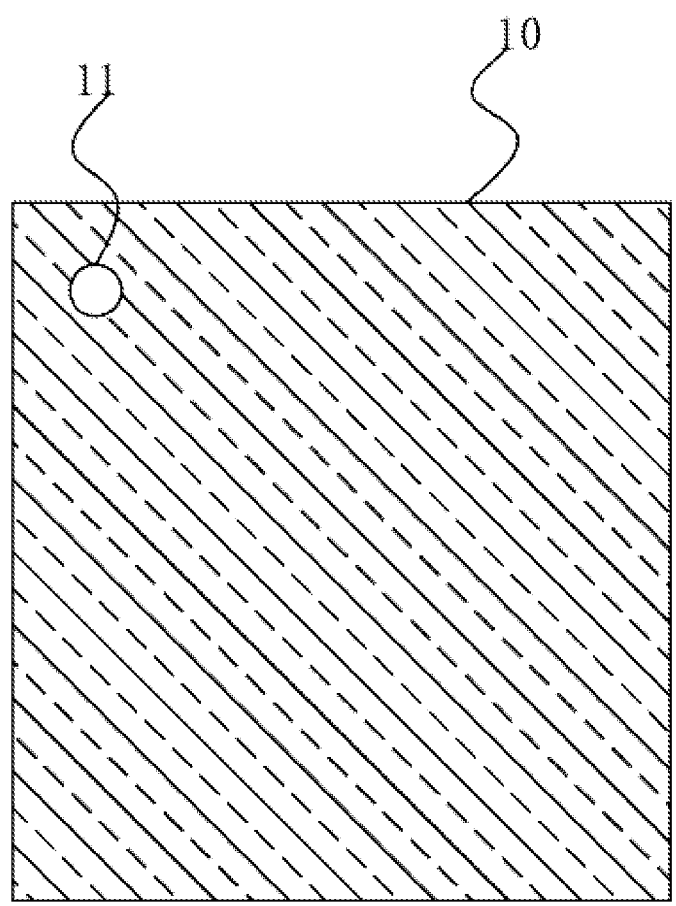
FIG. 2 is a schematic view showing the shape of a light transmission hole in an embodiment of the present invention.

As shown in FIG. 2, in an embodiment, the light transmission hole 11 is a circular hole.

It should be noted that, in actual implementation, the light transmission hole 11 may also be an elliptical hole, a square hole, a triangular hole or other shapes.

It should be noted that, in actual implementation, the light transmission hole 11 may be disposed at any position of the display body 10.

Figure 3:
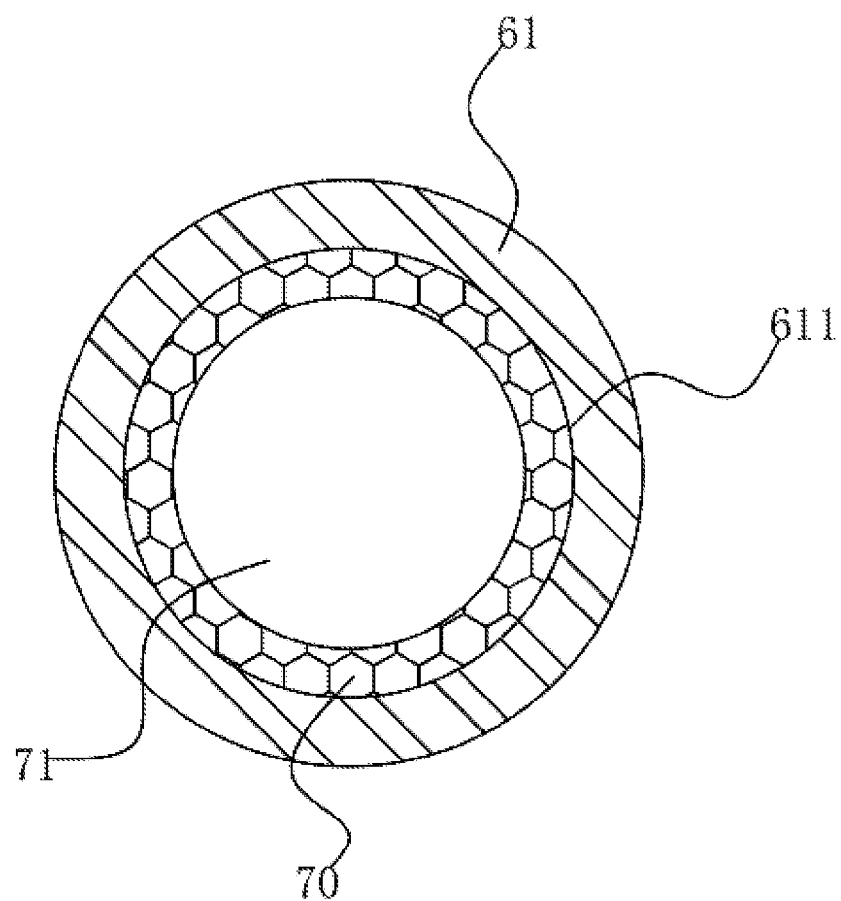
FIG. 3 is a schematic cross-sectional view of an annular shielding member in an embodiment of the present invention.

As shown in FIG. 3, in an embodiment, the annular shielding member 70 has an annular cross section as a whole, thereby achieving a better light blocking effect.

In an embodiment, a diameter of an outer ring of the annular shielding member 70 is the same with the diameter of the first through hole 611.

It should be noted that, in actual implementation, the cross section of the annular shielding member 70 may be an elliptical ring, a rectangular ring or other shapes.

In an embodiment, the annular shielding member 70 is made from a light shielding tape. After the annular shielding member 70 is formed by the light shielding tape, the annular shielding member 70 is attached to the display body 10. The manufacturing process and formation are simple, and it is easy to connect the annular shielding member 70 to the display body 10.

It should be noted that, in actual implementation, the annular shielding member 70 may also be made from other materials that are simple in shape and have light shielding properties, such as black plastic, metal, wood, etc., which are not enumerated here.

The beneficial effects of the invention are that after the lower polarizer 30 is aligned with and attached to the display body 10, the light shielding adhesive layer 80 is coated in the third through hole 31, and the light shielding adhesive layer 80 is used to fill in an area between the third through hole 31 and the light transmission hole 11, then the backlight plate 60 is bonded to the display body 10 by the bonding layer 90. When the backlight plate 60 is installed on the display body 10, the first through hole 611 is used to align with the light transmission hole 11 to ensure installing precision. After the backlight plate 60 is installed on the display body 10, the excess light shielding adhesive layer 80 is removed, and the annular shielding member 70 is installed in the first through hole 611. The second through hole 71 in the annular shielding member 70 is used to aligned with the light transmission hole 11 to ensure installing precision of the annular shielding member 70, thereby under the premise of ensuring size of the light transmission hole 11 is unchanged, size of the lighting area of the light transmission hole 11 is not affected, and the annular shielding member 70 is used instead of the double-coating process of a light shielding glue, light is prevented from leaking to the lighting area of the camera, and the problems such as lack of glue or glue overflowing in the coating of the light shielding glue caused by coating precision are prevented, thereby avoiding problems such as the circular hole 11 is not perfectly round, or edge line of the circular hole 11 is indented or protruding.

As described above, although the present invention has been disclosed with the preferred embodiments thereof, the above preferred embodiments are not intended to limit the invention, those skilled in the art will appreciate that various modifications, additions, and substitutions are possible, without departing from the scope and the spirit of the invention. Accordingly, the scope of the present invention is intended to be defined only by reference to the claims.

What is claimed is:

1. A liquid crystal display panel, wherein the liquid crystal display panel comprises a display body, an upper polarizer, a lower polarizer, and a backlight plate disposed on a back side of the lower polarizer; the display body comprises a light transmission hole; the backlight plate comprises a light shielding plate connected to the display body, the light shielding plate is provided with a first through hole coaxial with the light transmission hole, and a diameter of the first through hole is greater than a diameter of the light transmission hole;

wherein the display body is provided with an annular shielding member located in the first through hole, the annular shielding member is provided with a second through hole coaxial with the light transmission hole, a diameter of the second through hole is greater than or equal to the diameter of the light transmission hole; the annular shielding member is in contact with a sidewall of the first through hole; and the annular shielding member is made from a light shielding tape, wherein the lower polarizer is provided with a third through hole coaxial with the light transmission hole, and a diameter of the third through hole is greater than the diameter of the first through hole, and wherein the display body is provided with a light shielding adhesive layer between a sidewall of the third through hole and the annular shielding member.

2. The liquid crystal display panel as claimed in claim 1, wherein a bonding layer is disposed between the light shielding plate and the light shielding adhesive layer, and the light shielding plate is connected to the light shielding adhesive layer by the bonding layer.

3. The liquid crystal display panel as claimed in claim 2, wherein the bonding layer is a black light blocking layer.

4. The liquid crystal display panel as claimed in claim 2, wherein a distance between a side of the light shielding plate near to the display body and the display body is less than a thickness of the annular shielding member.

5. The liquid crystal display panel as claimed in claim 1, wherein the annular shielding member has an annular cross section as a whole.

6. The liquid crystal display panel as claimed in claim 1, wherein a fourth through hole coaxial with the light transmission hole is disposed on the upper polarizer, and a diameter of the fourth through hole is greater than or equal to the diameter of the light transmission hole.

7. A liquid crystal display panel, wherein the liquid crystal display panel comprises a display body, an upper polarizer, a lower polarizer, and a backlight plate disposed on a back side of the lower polarizer; the display body comprises a light transmission hole; the backlight plate comprises a light shielding plate connected to the display body, the light shielding plate is provided with a first through hole coaxial with the light transmission hole, and a diameter of the first through hole is greater than a diameter of the light transmission hole;

wherein the display body is provided with an annular shielding member located in the first through hole, the annular shielding member is provided with a second through hole coaxial with the light transmission hole, and a diameter of the second through hole is greater than or equal to the diameter of the light transmission hole, wherein the lower polarizer is provided with a third through hole coaxial with the light transmission hole, and a diameter of the third through hole is greater than the diameter of the first through hole, and wherein the display body is provided with a light shielding adhesive layer between a sidewall of the third through hole and the annular shielding member.

8. The liquid crystal display panel as claimed in claim 7, wherein the annular shielding member is made from a light shielding tape.

9. The liquid crystal display panel as claimed in claim 7, wherein a bonding layer is disposed between the light shielding plate and the light shielding adhesive layer, and the light shielding plate is connected to the light shielding adhesive layer by the bonding layer.

10. The liquid crystal display panel as claimed in claim 9, wherein the bonding layer is a black light blocking layer.

11. The liquid crystal display panel as claimed in claim 9, wherein a distance between a side of the light shielding plate near to the display body and the display body is less than a thickness of the annular shielding member.

12. The liquid crystal display panel as claimed in claim 7, wherein the annular shielding member is in contact with a sidewall of the first through hole.

13. The liquid crystal display panel as claimed in claim 12, wherein the annular shielding member has an annular cross section as a whole.

14. The liquid crystal display panel as claimed in claim 7, wherein a fourth through hole coaxial with the light transmission hole is disposed on the upper polarizer, and a diameter of the fourth through hole is greater than or equal to the diameter of the light transmission hole.

* * * * *